United States Patent [19]
Borling et al.

[11] Patent Number: 5,791,130
[45] Date of Patent: Aug. 11, 1998

[54] BAG LOCATION RIDING MOWER

[75] Inventors: Al Borling, Valley City; Axel Schaedler, North Royalton, both of Ohio

[73] Assignee: MTD Products Inc., Cleveland, Ohio

[21] Appl. No.: 707,590

[22] Filed: Sep. 5, 1996

[51] Int. Cl.[6] .......................... A01D 34/64; A01D 34/70
[52] U.S. Cl. ...................... 56/202; 56/14.7; 220/334
[58] Field of Search .................. 56/14.7, 202, 203, 56/206, 320.1, 320.2, DIG. 22; 220/334; 298/29, 30, 31, 33

[56] References Cited

U.S. PATENT DOCUMENTS

| | | | |
|---|---|---|---|
| 2,012,855 | 8/1935 | Kopchinsky | 220/334 X |
| 3,199,277 | 8/1965 | Moody | 56/202 X |
| 3,461,474 | 8/1969 | McCandless | 298/30 X |
| 4,193,159 | 3/1980 | Beard | 298/30 X |
| 4,532,755 | 8/1985 | Schemelin et al. | 56/320.2 X |
| 4,702,063 | 10/1987 | Satoh et al. | 56/202 |
| 4,745,735 | 5/1988 | Katayama | 56/202 |
| 4,916,887 | 4/1990 | Mullet et al. | 56/320.2 |
| 4,986,062 | 1/1991 | Hill | 56/320.2 X |
| 5,388,394 | 2/1995 | Heismann | 56/203 X |
| 5,473,871 | 12/1995 | Fava et al. | 56/203 X |

FOREIGN PATENT DOCUMENTS

| | | | |
|---|---|---|---|
| 254657 | 1/1988 | European Pat. Off. | 56/202 |
| 1169394 | 12/1958 | France | 220/334 |
| 2838368 | 3/1980 | Germany | 56/320.2 |

*Primary Examiner*—John A. Ricci
*Attorney, Agent, or Firm*—Roger D. Emerson

[57] ABSTRACT

A riding mower is provided with a grass collection bag located in the vertical space between the riding seat and the rotating blade. The seat is mounted on an exterior surface of a hood which encloses the bag during a grass cutting operation. The hood is moveable to permit access to the bag. The bag is equipped with a handle for easy removal from the mower body. The contents of the bag are emptied through the bottom of the bag. An air flow indicator signals an operator as to the need to empty the bag. A view window in the enclosing hood allows the operator to observe the indicator.

25 Claims, 6 Drawing Sheets

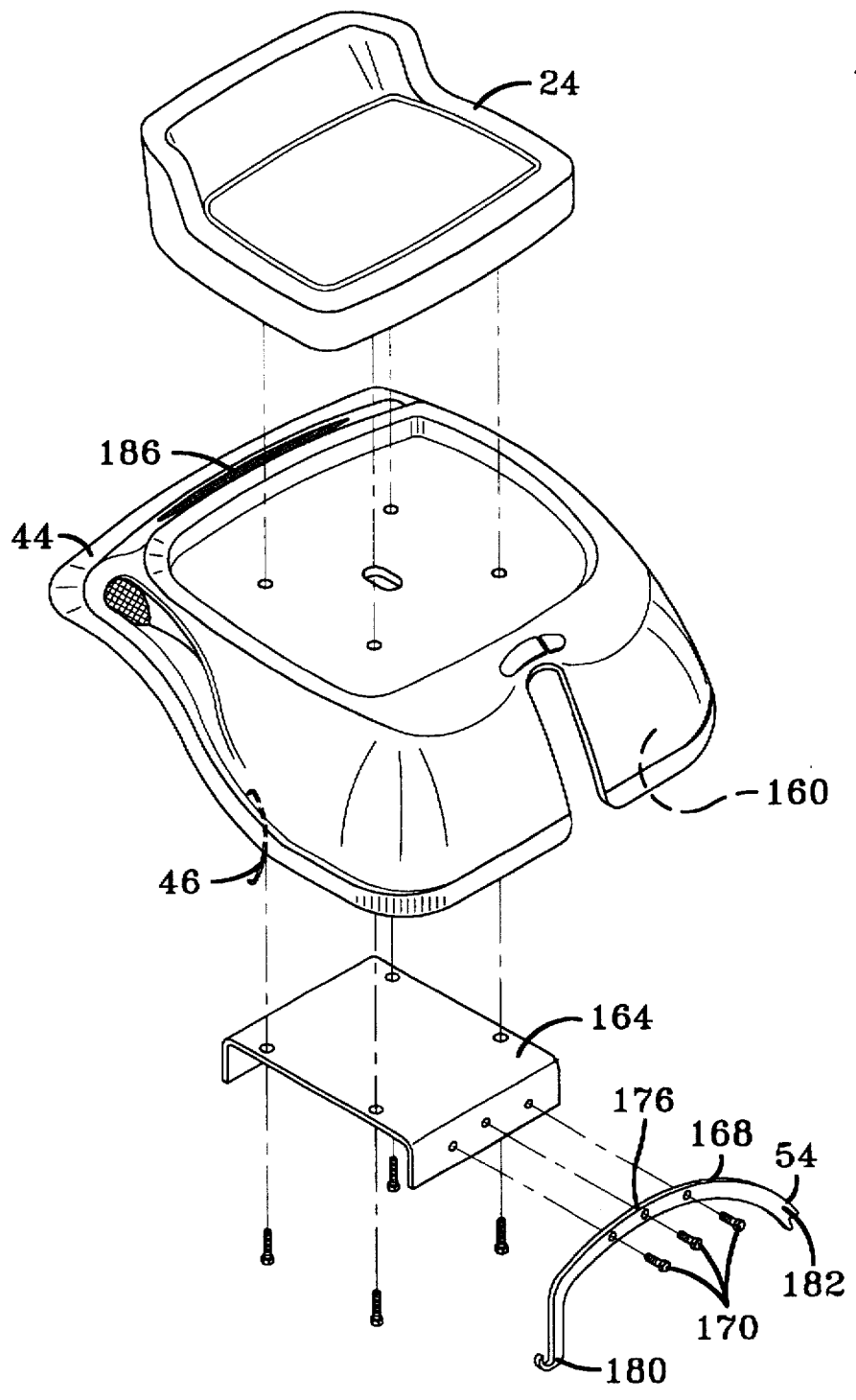

5,791,130

BAG LOCATION RIDING MOWER

BACKGROUND OF THE INVENTION

1. Field of Invention

This invention pertains to the art of methods and apparatuses for grass cutting lawn tractors, and more specifically to methods and apparatuses for lawn tractors having collection means for collecting grass clippings.

2. Description of the Related Art

Lawn tractors which utilize some manner of collecting and temporarily storing grass clippings are common in the art. Such lawn tractors may include collection bags which extend from the side or the rear of the vehicle. As the grass cutting blade rotates, the grass is cut and grass clippings are generated. Blades have been designed so that their rotation creates an airflow which transports the grass clippings from the blade area to the collection bags.

The present invention provides methods and apparatuses for collecting, temporarily storing, and disposing of associated grass clippings within a grass cutting vehicle. The apparatus is easier to use and more compact than the lawn tractors known in the art.

SUMMARY OF THE INVENTION

The present invention is directed to a grass cutting vehicle employing a grass clipping collection system, and more specifically to a vehicle having collection means disposed in the vertical space between a riding seat and a rotating blade.

According to one aspect of the present invention, a collection system for a grass cutting vehicle having a body and a rotating cutting blade acting in a generally horizontal plane, the blade being vertically spaced from a riding seat, and the rotating blade providing pneumatic transport of associated grass clippings is provided. The collection system comprises collection means for collecting the associated grass clippings, the collection means being located in the vertical space between the seat and the cutting blade.

According to another aspect of the invention, the collection means comprises a housing having a top wall, a side wall extending generally perpendicular thereto, and a bottom wall, the bottom wall being closely received to the side wall along a bottom edge thereof and being selectively retained in a closing relationship to an interior of the housing, and retention means for selectively retaining the bottom wall in the closing relationship.

According to another aspect of the invention, the collection means further comprises intaking means for intaking the associated grass clippings, the intaking means having a channel therethrough communicating with the interior through an opening in the housing.

According to another aspect of the invention, the collection means further comprises venting means for venting air from the housing interior, the venting means generally preventing the passage of grass clippings from the interior.

According to another aspect of the invention, the collection system further comprises indicator means for indicating air flow through the interior of the collection means.

According to another aspect of the invention, the collection system further comprises directing means for directing the pneumatic passage of grass clippings from the cutting blade toward the housing.

According to another aspect of the invention, the collection system further comprises enclosing means for selectively enclosing the collection means, the enclosing means being moveable from a covering position to an uncovering position with respect to the collection means.

According to another aspect of the invention, the riding seat is attached to an exterior surface of the enclosing means.

According to another aspect of the invention, the collection system further comprises emptying means for emptying the associated grass clippings from an interior of the collection means.

According to another aspect of the invention, a bag for collecting grass clippings in a grass cutting vehicle is provided. The bag comprises a housing having a top wall, a side wall extending generally perpendicular thereto, and a bottom wall closely received to the side wall along a bottom edge thereof and selectively retained in a closing relationship to an interior of the housing, retention means for selectively retaining the bottom wall in the closing relationship, and releasing means for selectively releasing the bottom wall from the closing relationship.

According to another aspect of the invention, the bag further comprises a handle attached to an exterior of the housing and being spaced from the bottom wall.

According to another aspect of the invention, the bag housing includes a plurality of perforations in the top, bottom, and side walls, each of the perforations allowing the passage of air while generally preventing the passage of grass clippings therethrough.

According to another aspect of the invention, a method of producing a grass cutting vehicle having a body and a rotating cutting blade acting in a generally horizontal plane, the cutting blade generating associated grass clippings is provided. The method comprising the steps of positioning collection means in a space above the blade, selectively positioning a moveable hood above the collection means, and attaching a riding seat to an exterior surface of the hood so that the riding seat is vertically positioned above the collection means.

One advantage of the present invention is the compact structure of the lawn cutting vehicle.

Another advantage of the present invention is the manner in which the collection means is hidden from view.

Another advantage of the present invention is the ease with which the collected grass clippings are disposed. For example, the receptacle or collection means into which the clippings are received can be emptied without inversion.

Another advantage of the present invention is way in which an operator can readily determine if the bag requires emptying.

Still other benefits and advantages of the invention will become apparent to those skilled in the art to which it pertains upon a reading and understanding of the following detailed specification.

BRIEF DESCRIPTION OF THE DRAWINGS

The invention may take physical form in certain parts and arrangement of parts, a preferred embodiment of which will be described in detail in this specification and illustrated in the accompanying drawings which form a part hereof and wherein:

FIG. 7 is an exploded view showing the hood of the present invention.

DESCRIPTION OF THE PREFERRED EMBODIMENT

Figure 1:
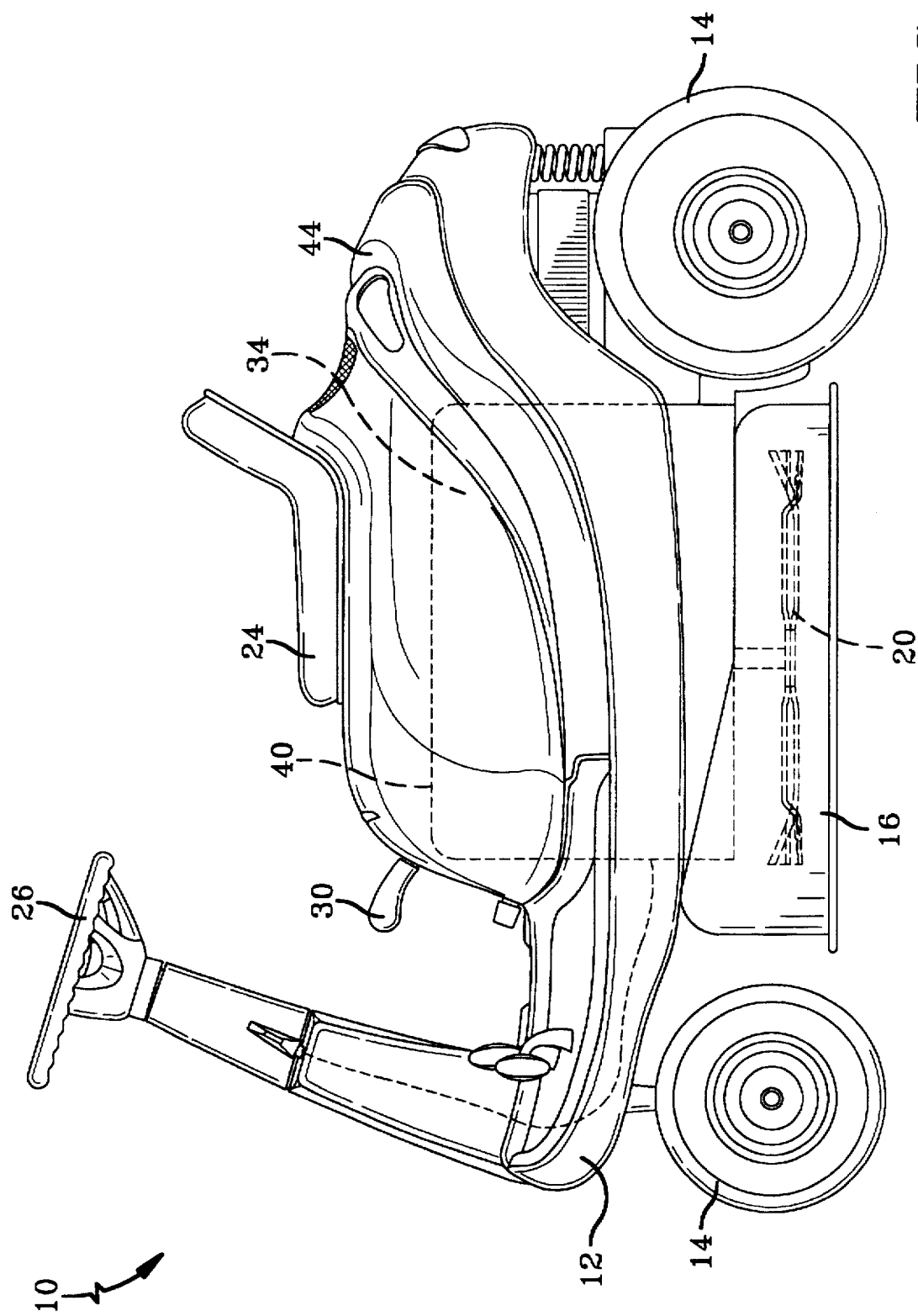
FIG. 1 is a left side view of a grass cutting vehicle according to the present invention.

Referring now to the drawings wherein the showings are for purposes of illustrating a preferred embodiment of the invention only and not for purposes of limiting the same, FIG. 1 illustrates a right side view of a grass cutting vehicle 10. The vehicle 10 includes a body 12 mounted on wheels 14 and having a blade guard 16 circularly disposed around a generally horizontal cutting blade 20. The vehicle 10 is of the riding mower type having a riding seat 24, steering means 26, and blade height adjustment means 30. Grass clippings generated by the blade 20 are carried along by the airflow generated by the rotating blade (pneumatically transported) to collection means 34 where the clippings are collected and temporarily stored for later removal and disposal.

An important aspect of the present invention is the collection system for collecting the associated grass clippings. As is evident in FIG. 1, the riding seat 24 is generally vertically spaced from the blade 20. In a preferred embodiment, the collection means, generally referred to as a bag 40, is located in the vertical space between the riding seat 24 and the blade 20. As is further evident from FIG. 1, the bag 40 is generally obscured from view during a mowing operation by an enclosing means, generally referred to as a hood 44. The location of the bag 40 provides a more compact cutting vehicle than prior art mowers which employ rear or side bags. Also, because the bag 40 is generally obscured from view, the vehicle 10 of the present invention provides a more pleasing appearance and allows the mower to be smaller, about the same size as a walk-behind mower. The footprint of the mower is minimized.

Figure 2:
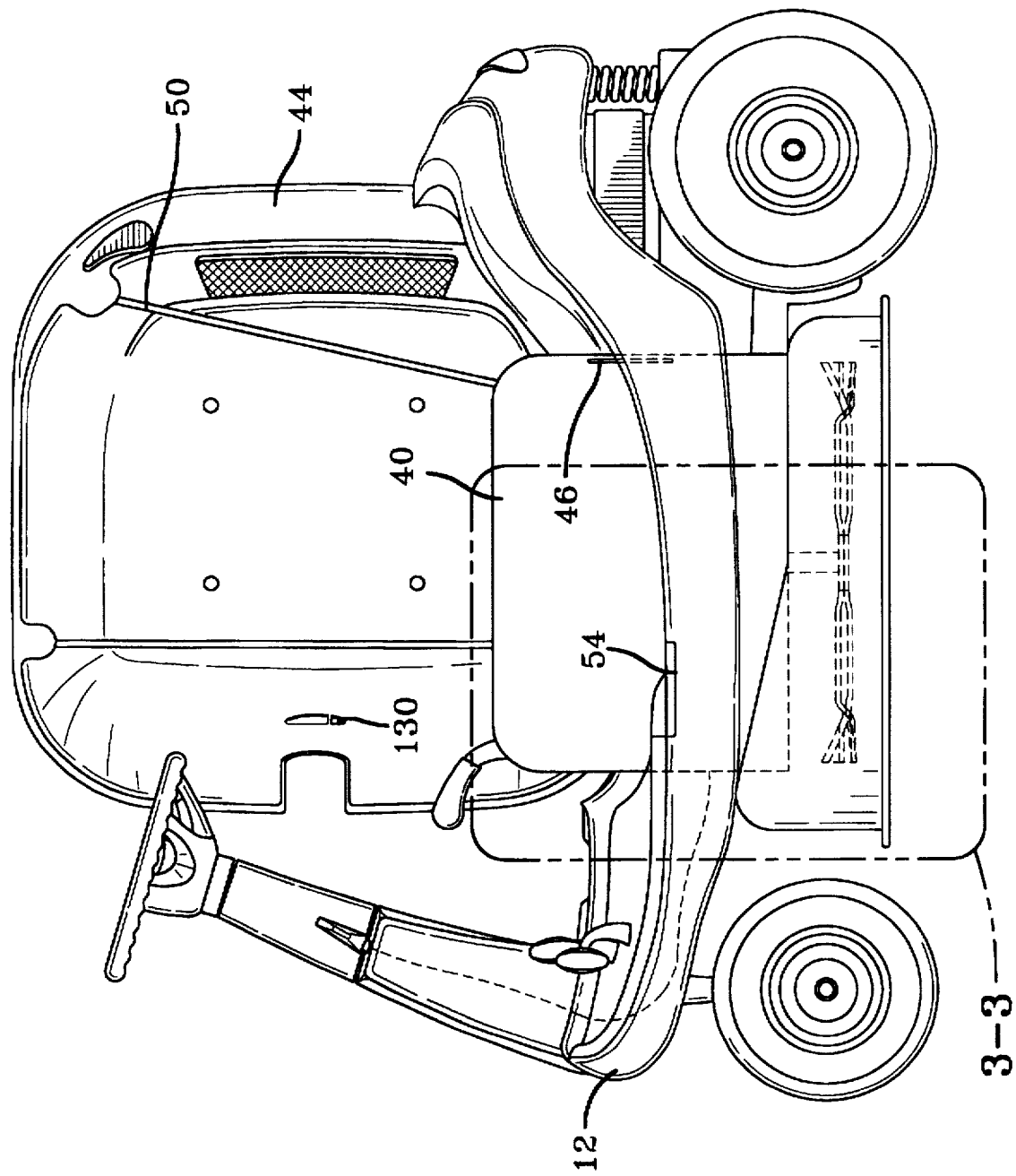
FIG. 2 is a left side view similar to FIG. 1 showing a hood of the grass cutting vehicle in an open position.
Figure 3:
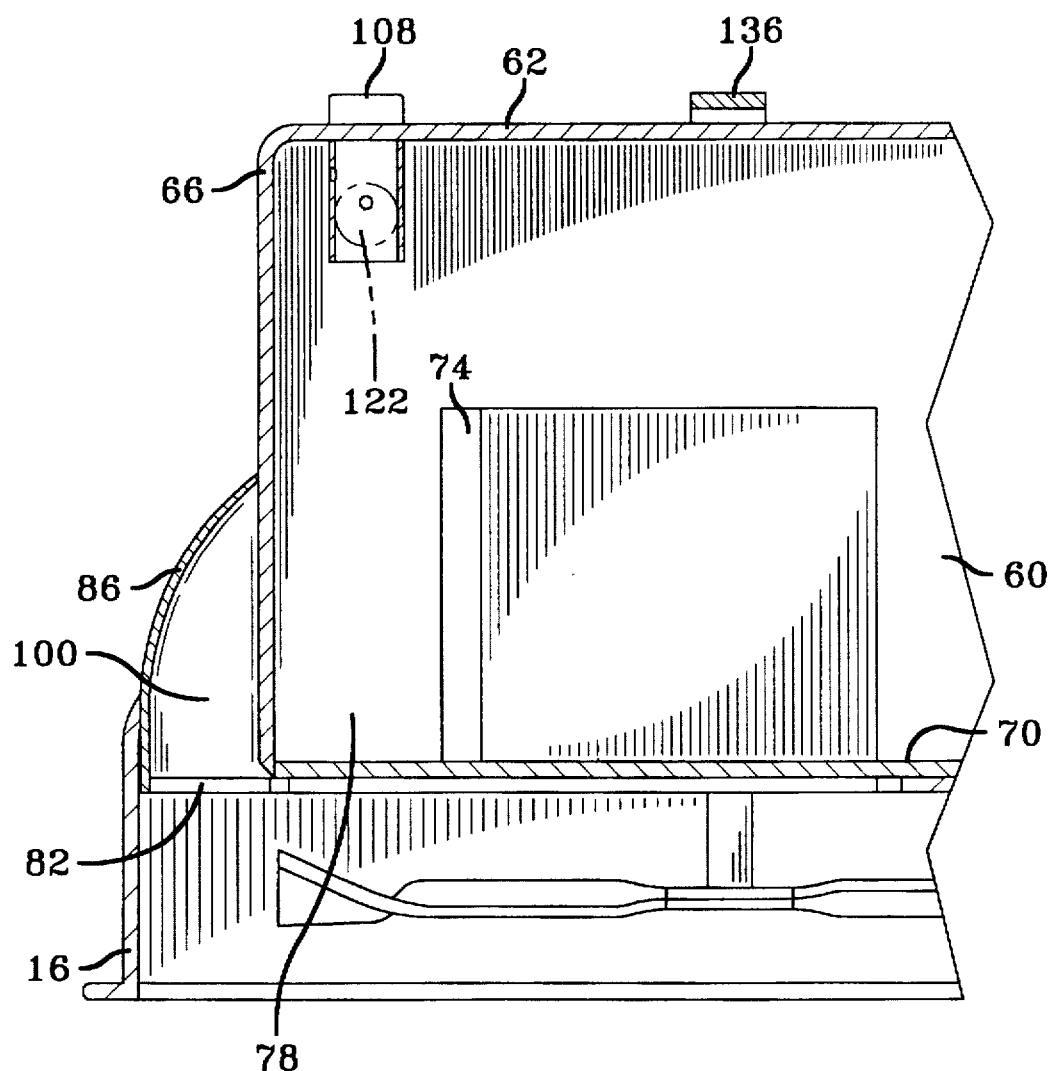
FIG. 3 is an exploded view of circle 3—3 illustrating a portion of FIG. 2, partly in section.
Figure 4:
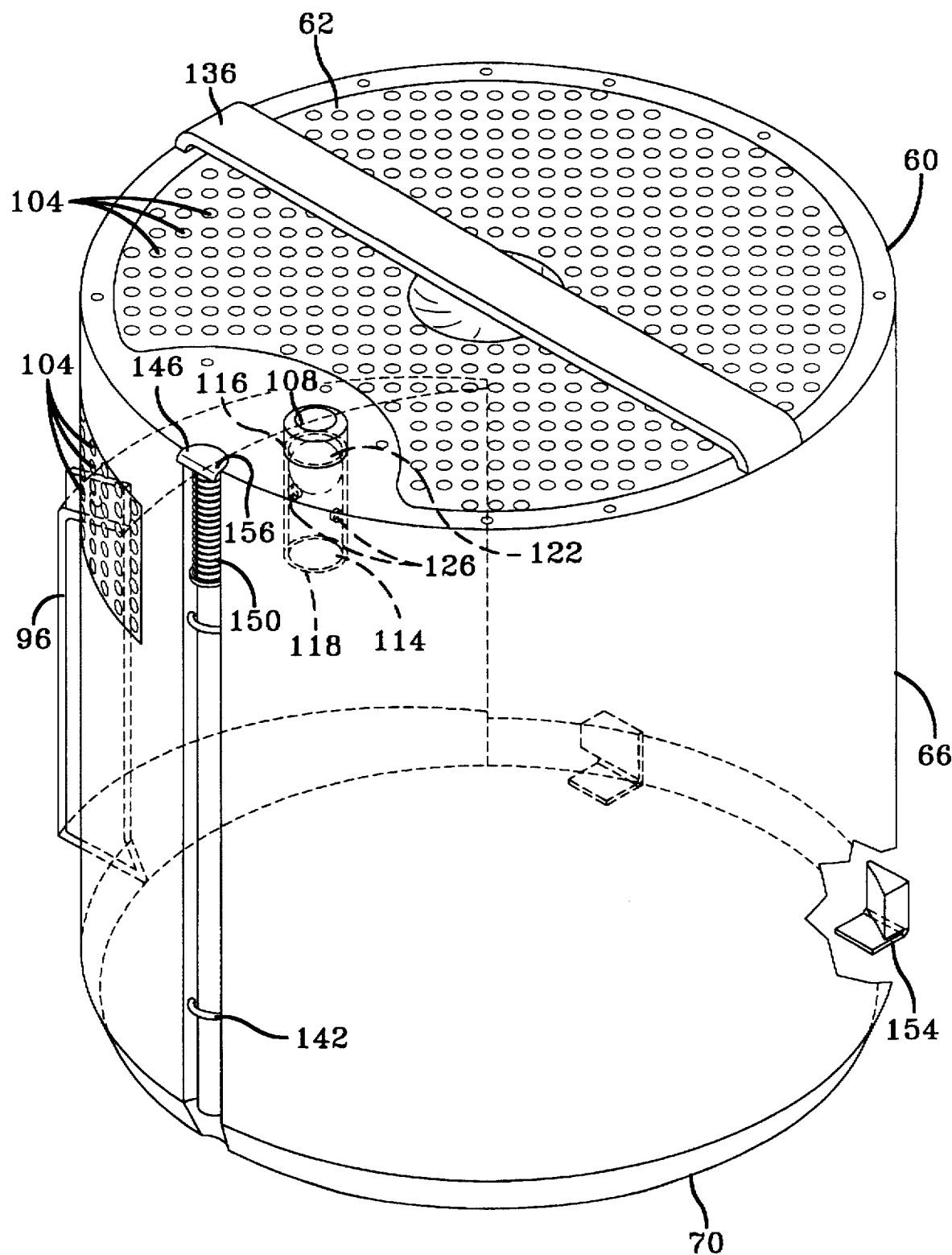
FIG. 4 shows a perspective view of the front and top view of a grass clipping collection bag according to the present invention.
Figure 5:
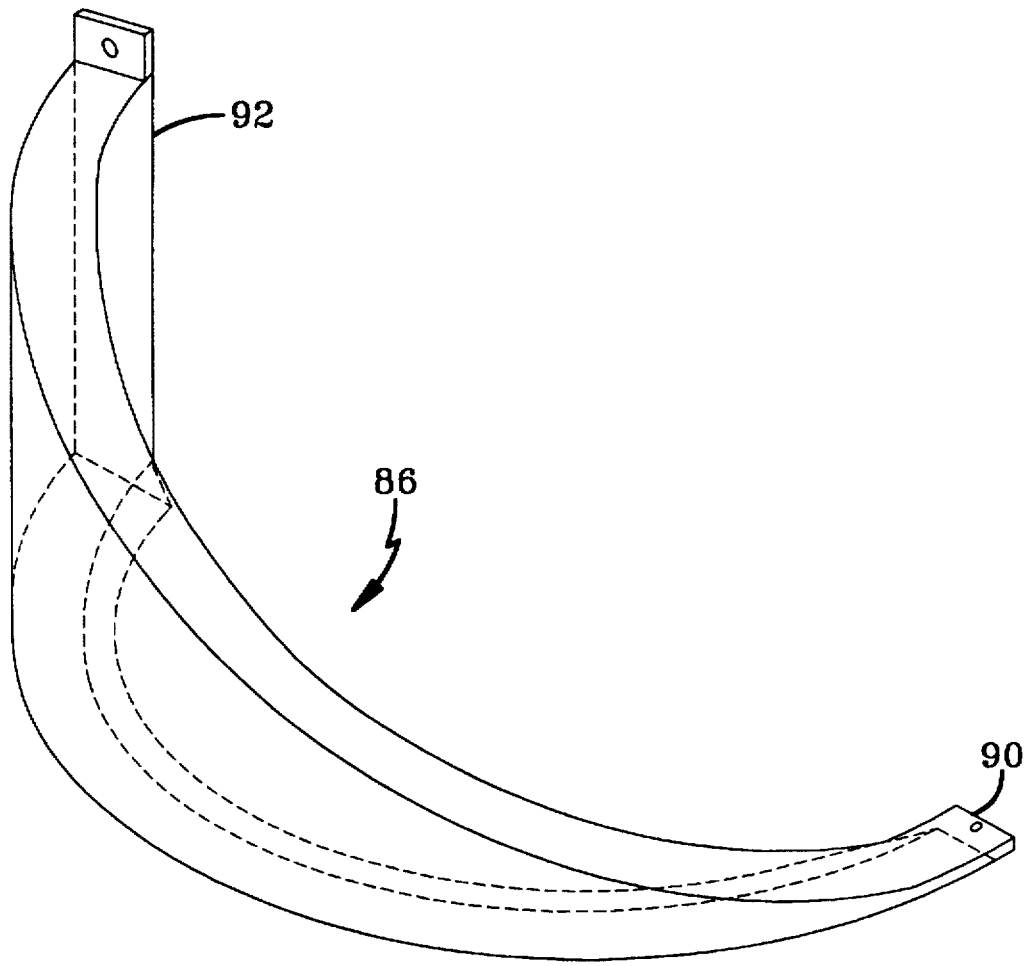
FIG. 5 shows a perspective view of a duct comprising a portion of the grass clipping apparatus, showing the front and top sides of the duct.
Figure 6:
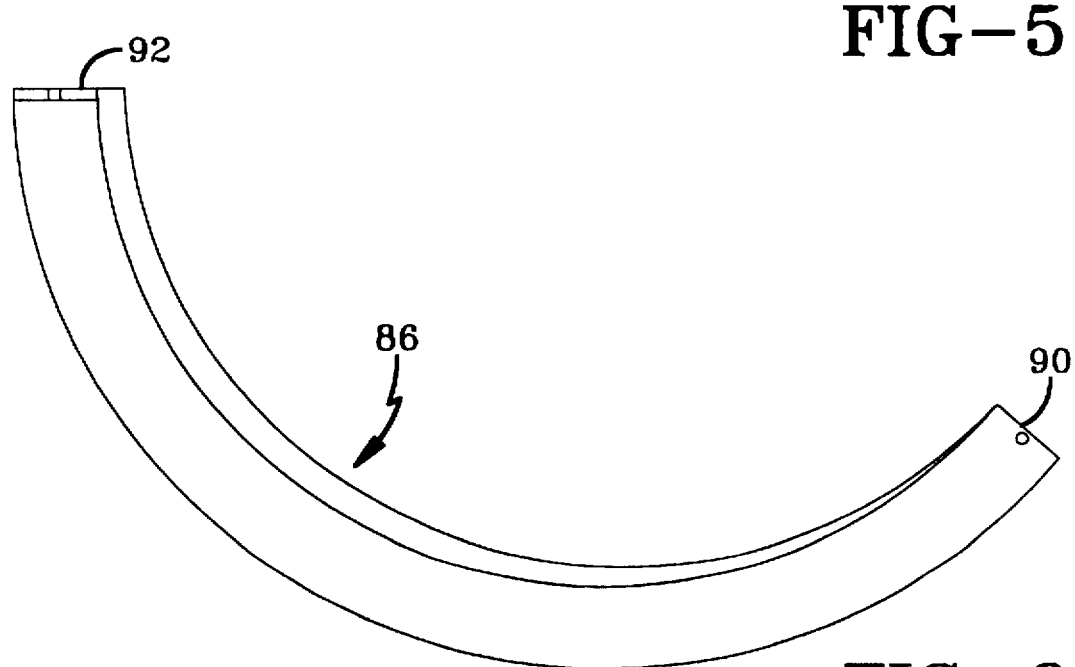
FIG. 6 shows a perspective view of the duct of FIG. 5 showing the bottom and back sides of the duct.

With reference to FIG. 2, the hood 44 is moveable with respect to the bag 40 from a first, closed position (as illustrated in FIG. 1) to a second, open position (as illustrated in FIG. 2). The second, open position facilitates the removal of the bag 40 from the vehicle 10 to enable the emptying of the bag 40. In a preferred embodiment, the hood 44 is attached to the body 12 in hinged relationship, with the hinge 46 being located along a lateral side of the hood 44. In the preferred embodiment illustrated in FIG. 2, the hinge 46 is located on the right lateral side of the vehicle 10. It is within the scope of the present invention to provide a hood 44 which completely disengages from the body 12 in order to empty the bag 40. It is within the scope of the present invention to provide a hood 44 which hinges from the other (or left) lateral side or from the front or rear side of the hood 44.

A preferred embodiment further includes holding means for holding the hood 44 in the open position. The holding means may comprise a rod 50 similar to the type used to support an automobile hood in an open position. Alternately, the holding means may be part of a locking hinge or a cable. In addition, any type of holding means common to the art may be employed within the scope of the present invention.

A preferred embodiment further includes access means for accessing the bag 40 when the hood 44 is in the closed position. Preferably, the access means includes a catch 54 which is easily reached by the operator and generally requires the use of only one hand. Catch 54 is engaged between body 12 and hood 44 when the hood 44 is in a closed position and is disengaged to allow movement of the hood 44 to the open position. In a preferred embodiment, catch 54 is located on one side of the vehicle 10 and the hood 44 swings toward the other side of the vehicle 10. In the preferred embodiment, the catch 54 is located on the left lateral side of the vehicle to facilitate ease of opening by the driver. In those countries which require left hand drive automobiles, locating the catch 54 on the left hand side of the vehicle may be preferable, while cutting vehicles 10 to be sold in countries where automobiles are right hand drive may feature the catch 54 on the right hand side of the cutting vehicle 10.

The details of the bag 40 and the manner of collecting and disposing of the grass clippings will be described with particular reference to FIGS. 3–6. While the receptacle for catching and retaining the clippings is referred to as a "bag," in the preferred embodiment the bag 40 doesn't resemble prior art bags in many ways. For example, in the preferred embodiment, the bag 40 is rigid and made of plastic or fiberglass, not flexible like prior art cloth bags. Nonetheless, the invention will be described in terms of a bag.

The bag 40 includes a hollow housing 60 having a top wall 62, side wall 66, and a bottom wall 70. Preferably, the housing 60 of the bag 40 is formed of a lightweight rigid material such as fiberglass or plastic. An opening 74 is provided in the side wall 66 to allow passage of the grass clippings into the interior 78 of the housing 60.

As the blade 20 rotates, the grass clippings produced thereby are transported by the air stream in a generally vertical upward direction. Blade guard 16 provides a curved channel 82 for the upward movement of the grass clippings. Immediately adjacent the blade guard 16 is directing means, generally referred to as duct 86, for directing the movement of grass clippings toward housing 60. The duct 86 is generally open along an underside thereof and compatibly curved with curved channel 82. Additionally, the cross-sectional area enclosed by duct 86 generally increases from first end 90 to second end 92. The second end 92 abuts an intaking means 96 for intaking the grass clippings from duct 86 into housing interior 78. In a preferred embodiment, intaking means 96 is secured to housing 60 and is removably attached to the second end 92 of duct 86. During a lawn mowing operation, there exists a continuous passageway 100 from the cutting blade 20 to housing interior 78.

The air stream generated by the rotating blade 20 and which transports the grass clippings to the bag 40 is vented from the housing interior 78 through venting means. The venting means may include a plurality of perforations 104 in the housing 60. The perforations 104 are preferably located in the side wall 66 of housing 60 as well as in top wall 62. The perforations 104 allow passage of air, but are sized to generally prevent passage of grass clippings from the housing interior 78.

Because the amount of grass clippings which can be transported is dependent on air flow, a preferred embodiment includes an air flow indicator 108. The indicator 108 alerts the operator, or indicates to the operator, to a filled bag situation, because as the bag fills with grass clippings, the air flow decreases. The indicator 108 is preferably attached to housing 60. The air flow indicator 108 of a preferred embodiment comprises a tube 114 which has top and bottom walls 116, 118, respectively. A lightweight ball 122, such as a ping pong ball, is enclosed in the tube 114 and is freely moveable therein. The tube 114 is provided with holes 126 to allow passage of air therethrough. As air flows through the tube 114, the lightweight ball 122 dances around, but if the air flow is diminished to an ineffective level, the ball 122 generally remains still. In a preferred embodiment, at least the top wall 116 of the tube 114 is transparent and is located outside of the top wall 62 of housing 60. The remainder of the tube 114 is in the housing interior 78. With reference to FIGS. 1 and 2, a view window 130 is provided in the hood 44 so that when the hood 44 is in a covering position, an operator can view the indicator 108. The operator can look through the view window 130 and readily check if the behavior of the ball 122 suggests the need to empty the bag 40.

In order to empty the bag 40, the operator disengages the catch 54 and directs the hood 44 from the closed position to the open position. Holding means 50 are then employed to retain the hood 44 in the open position. The bag 40 is equipped with removal means to facilitate removal of the bag 40 from the body 12. In a preferred embodiment, the removal means is a single raised handle 136 disposed on the top wall 62 and in the center of the housing 60. Other embodiments may include a pair of handles disposed on the top wall 60 or on the side wall 66 near an upper edge thereof. The bag 40 is then lifted away from the body 12. In a preferred embodiment, the intaking means 96 readily separates from duct 86 as bag 40 is lifted.

The bottom wall 70 of the housing 60 is preferably solid to keep the grass clippings within the housing interior 78 as the bag 40 is lifted. In a preferred embodiment, the bottom wall 70 is moveable in hinged relationship to the side wall 66. The bag 40 is equipped with retention means 142 for selectively retaining the bottom wall 70 in closing relationship with the housing interior 60. The bag 40 further includes releasing means 146 to allow the grass clippings to exit the housing 60. In a preferred embodiment, the retention means 142 comprises a spring-loaded latch 150 disposed opposite a hinge 154. The preferred releasing means 146 is preferably a release handle 156 which acts to release the spring-loaded latch 150 so that the bottom wall 70 can swing toward the hinge 154. Preferably, the releasing means 146 can be easily operated by one hand. In that way, one of the operator's hands is used to hold the bag 40 above the place where the grass clippings are to be emptied and the other hand can easily operate the releasing means 146. Because the raised handle 136 is in the center of the bag 40, the bag 40 is balanced and can be lifted with one hand.

As described above, the filling and emptying of the bag 44 doesn't require the bag 44 be inverted. This feature lowers any risk of injury to the operator's back or shoulders by eliminating the need to lift and invert the bag 44. It is believed that the action of emptying the grass clippings from the bottom of the bag 40 rather than inverting the bag 44 as required by prior art mowing vehicles is a novel feature of the present invention.

The details of hood 44 are best shown in FIG. 7. Attached to undersurface 160 of hood 44 is a support plate 164 directly beneath the riding seat 24. In a preferred embodiment, a narrow support rod 168 extends between the lateral sides of hood 44 and generally mates with undersurface 160. Mounting means 172 are provided to mount support rod 168 to support plate 164 near the middle 176 of support rod 168. In a preferred embodiment, one end 180 of support rod 168 is hooked in order to cooperate with hinge 46 to direct movement of the hood 44 with respect to body 12. The other end 182 of support rod 168 comprises catch 54 which retains the hood in closed position. A preferred embodiment further includes screen member 186 to permit air flow through hood 44.

Because the grass is cut with the front half of the deck and is immediately discharged into the chute without being recut, greater efficiencies of motor, fuel, power and blade are obtained.

The preferred embodiments have been described, herein above. It will be apparent to those skilled in the art that the above methods may incorporate changes and modifications without departing from the general scope of this invention. It is intended to include all such modifications and alterations in so far as they come within the scope of the appended claims or the equivalents thereof.

Having thus described the invention, it is now claimed:

1. A collection system for a grass cutting vehicle having a body and a rotating cutting blade acting in a generally horizontal plane, the blade being vertically spaced from a riding seat and the rotating blade providing pneumatic transport of associated grass clippings, the system comprising:

collection means for collecting the associated grass clippings, said collection means being located in the vertical space between said seat and said cutting blade.

2. The collection system of claim 1 wherein said collection means comprises:

a housing having a top wall, a side wall extending generally perpendicular thereto, and a bottom wall, said bottom wall being closely received to said side wall along a bottom edge thereof and being selectively retained in a closing relationship to an interior of said housing; and, retention means for selectively retaining said bottom wall in said closing relationship.

3. The collection system of claim 2 wherein said collection means further comprises:

intaking means for intaking the associated grass clippings, said intaking means having a channel therethrough, said channel communicating with said interior through an opening in said housing.

4. The collection system of claim 3 wherein said collection means further comprises:

venting means for venting air from said interior, said venting means generally preventing the passage of grass clippings from said interior.

5. The collection system of claim 4 wherein said venting means comprises:

a plurality of perforations in said side wall of said housing.

6. The collection system of claim 4 wherein said venting means comprises:

a plurality of perforations in said top wall of said housing.

7. The collection system of claim 2 further comprising:

indicator means for indicating air flow through said interior of said collection means.

8. The collection system of claim 7 wherein said indicator means comprises:

a tube having top and bottom walls to enclose a lightweight ball, the top wall of said tube being transparent and located on an exterior of said housing, the bottom wall being located within said housing interior, the tube having holes therein to allow air passage, said passage of air effecting movement of said ball.

9. The collection system of claim 2 further comprising:

directing means for directing the pneumatic passage of grass clippings from the cutting blade to said interior.

10. The collection system of claim 2 further comprising:

releasing means for releasing said retention means to allow said associated grass clippings to exit from said interior.

11. The collection system of claim 1 further comprising:

enclosing means for selectively enclosing said collection means, said enclosing means being moveable from an open position to a closed position with respect to said collection means.

12. The collection system of claim 11 wherein said enclosing means is attached to said body in hinged relationship.

13. The collection system of claim 11 further comprising:

holding means for holding said enclosing means in said closed position.

14. The collection system of claim 11 wherein said riding seat is attached to an exterior surface of said enclosing means.

15. The collection system of claim 11 further comprising:

access means for accessing said collection means.

16. The collection system of claim 15 wherein said access means comprises:

a catch located in an interior of said enclosing means, said catch being moveable between an engaged position and a disengaged position.

17. The collection system of claim 1 further comprising:

removal means for removing said collection means from said space.

18. The collection system of claim 17 wherein said removal means comprises:

a handle attached to said collection means.

19. A bag for collecting grass clippings in an associated grass cutting vehicle comprising:

a housing having a top wall, a side wall extending generally perpendicular thereto, and a bottom wall, said bottom wall being closely received to said side wall along a bottom edge thereof and being selectively retained in a closing relationship to an interior of said housing;

retention means for selectively retaining said bottom wall in said closing relationship;

releasing means for selectively releasing said bottom wall from said closing relationship; and, a handle attached to an exterior of said housing, said handle being spaced from said bottom wall.

20. The bag of claim 19 further comprising:

intaking means being closely received to said side wall and having a channel therethrough, said channel communicating with said housing interior through an opening in said housing.

21. The bag of claim 19 wherein said housing includes a plurality of perforations in said top and side walls, each of said perforations allowing the passage of air while generally preventing the passage of grass clippings therethrough.

22. A bag for collecting grass clippings in an associated grass cutting vehicle comprising:

a housing having a top wall, a side wall extending generally perpendicular thereto, and a bottom wall, said bottom wall being closely received to said side wall along a bottom edge thereof and being selectively retained in a closing relationship to an interior of said housing;

retention means for selectively retaining said bottom wall in said closing relationship;

releasing means for selectively releasing said bottom wall from said closing relationship;

a handle attached to an exterior of said housing, said handle being spaced from said bottom wall;

intake means being closely received to said side wall and having a channel therethrough, said channel communicating with said housing interior through an opening in said housing; and, an airflow indicator being located near a top of said housing.

23. A method of cutting, collecting and emptying grass with a grass cutting vehicle having a body and a rotating cutting blade acting in a generally horizontal plane, the cutting blade generating associated grass clippings, the method comprising the steps of:

positioning collection means in a vertical space directly above said blade;

driving said vehicle over the grass to be mowed;

rotating said cutting blade through the grass to be mowed;

dismounting said vehicle;

raising a moveable hood above said collection means;

removing said collection means from said vehicle; and, emptying said collection means.

24. The method of claim 23 further comprising the step of:

transporting said associated grass clippings from said blade toward said collection means.

25. The method of claim 23 wherein the collection means includes a bottom wall, retention means for selectively retaining said bottom wall in a closing relationship, and releasing means for selectively releasing said bottom wall from said closing relationship and wherein the step of emptying said collection means further includes the step of:

utilizing said releasing means to empty said associated grass clippings from said collection means.

\* \* \* \* \*